United States Patent
Shepard et al.

(10) Patent No.: US 9,635,028 B2
(45) Date of Patent: Apr. 25, 2017

(54) PROXY AUTHENTICATION

(75) Inventors: Luke Jonathan Shepard, San Francisco, CA (US); Julie Christina Tung, Mountain View, CA (US); Yariv Sadan, San Francisco, CA (US); Brent Justin Goldman, San Francisco, CA (US); Arun Vijayvergiya, San Francisco, CA (US); Naitik Hemant Shah, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 20 days.

(21) Appl. No.: 13/222,155

(22) Filed: Aug. 31, 2011

(65) Prior Publication Data

US 2013/0054803 A1 Feb. 28, 2013

(51) Int. Cl.
*G06F 15/173* (2006.01)
*H04L 29/06* (2006.01)
*G06F 21/44* (2013.01)
*G06F 21/62* (2013.01)
*G06F 21/00* (2013.01)

(52) U.S. Cl.
CPC .......... *H04L 63/0884* (2013.01); *G06F 21/44* (2013.01); *G06F 21/6281* (2013.01); *G06F 21/00* (2013.01); *H04L 63/0807* (2013.01)

(58) Field of Classification Search
USPC ................................................ 709/203, 225
See application file for complete search history.

(56) References Cited

U.S. PATENT DOCUMENTS

| | | | | |
|---|---|---|---|---|
| 7,366,787 | B2* | 4/2008 | Salas et al. | 709/229 |
| 7,802,294 | B2* | 9/2010 | Perlin | G06F 21/6218 713/172 |
| 7,836,018 | B2* | 11/2010 | Oliveira et al. | 707/634 |
| 8,051,491 | B1* | 11/2011 | Cavage et al. | 726/30 |
| 8,510,813 | B2* | 8/2013 | Kumar | G06F 21/31 726/7 |
| 8,533,797 | B2* | 9/2013 | Shah et al. | 726/7 |
| 8,719,849 | B1* | 5/2014 | Madampath | 719/330 |
| 8,763,089 | B2* | 6/2014 | Qureshi et al. | 726/4 |
| 2002/0169847 | A1* | 11/2002 | Luna et al. | 709/216 |
| 2003/0079120 | A1 | 4/2003 | Hearn | |
| 2003/0093666 | A1 | 5/2003 | Millen | |

(Continued)

OTHER PUBLICATIONS

International Search Report and Written Opinion for International Application No. PCT/US2012/048936, Nov. 28, 2012.

*Primary Examiner* — Joshua Joo
(74) *Attorney, Agent, or Firm* — Baker Botts L.L.P.

(57) ABSTRACT

In one embodiment, receiving, by an operating system of the first computing device and from a client application executing on the first computing device, a first request for accessing a set of data associated with a user of the first computing device, wherein the set of data is managed by a second computing device; sending, by the operating system and to the second computing device, a second request for accessing the set of data; receiving, by the operating system and from the second computing device, a response to the second request; and if the response to the second request grants the client application access to the set of data, then forwarding, by the operating system and to the client application, an access token to be used by the client application for accessing the set of data with the second computing device.

20 Claims, 2 Drawing Sheets

(56) References Cited

U.S. PATENT DOCUMENTS

| | | | | |
|---|---|---|---|---|
| 2003/0226036 | A1* | 12/2003 | Bivens et al. | 713/201 |
| 2005/0108521 | A1* | 5/2005 | Silhavy | G06F 21/31 |
| | | | | 713/156 |
| 2005/0160161 | A1 | 7/2005 | Barrett | |
| 2007/0289002 | A1* | 12/2007 | van der Horst et al. | 726/9 |
| 2008/0235782 | A1 | 9/2008 | Johnson | |
| 2008/0307138 | A1* | 12/2008 | Goldick | 710/200 |
| 2009/0319527 | A1* | 12/2009 | King et al. | 707/9 |
| 2010/0077467 | A1* | 3/2010 | Satagopan et al. | 726/7 |
| 2011/0126293 | A1* | 5/2011 | Berengoltz et al. | 726/26 |
| 2011/0154439 | A1* | 6/2011 | Patel et al. | 726/3 |
| 2012/0203701 | A1* | 8/2012 | Ayuso de Paul | 705/71 |
| 2012/0227086 | A1* | 9/2012 | Dale et al. | 726/3 |
| 2012/0266229 | A1* | 10/2012 | Simone et al. | 726/9 |
| 2012/0297065 | A1* | 11/2012 | Leahy et al. | 709/225 |
| 2013/0024919 | A1* | 1/2013 | Wetter | G06F 21/335 |
| | | | | 726/6 |
| 2013/0054732 | A1* | 2/2013 | Serlet et al. | 709/213 |
| 2013/0067568 | A1* | 3/2013 | Obasanjo | H04L 63/0807 |
| | | | | 726/20 |
| 2013/0081126 | A1* | 3/2013 | Soukup et al. | 726/8 |

\* cited by examiner

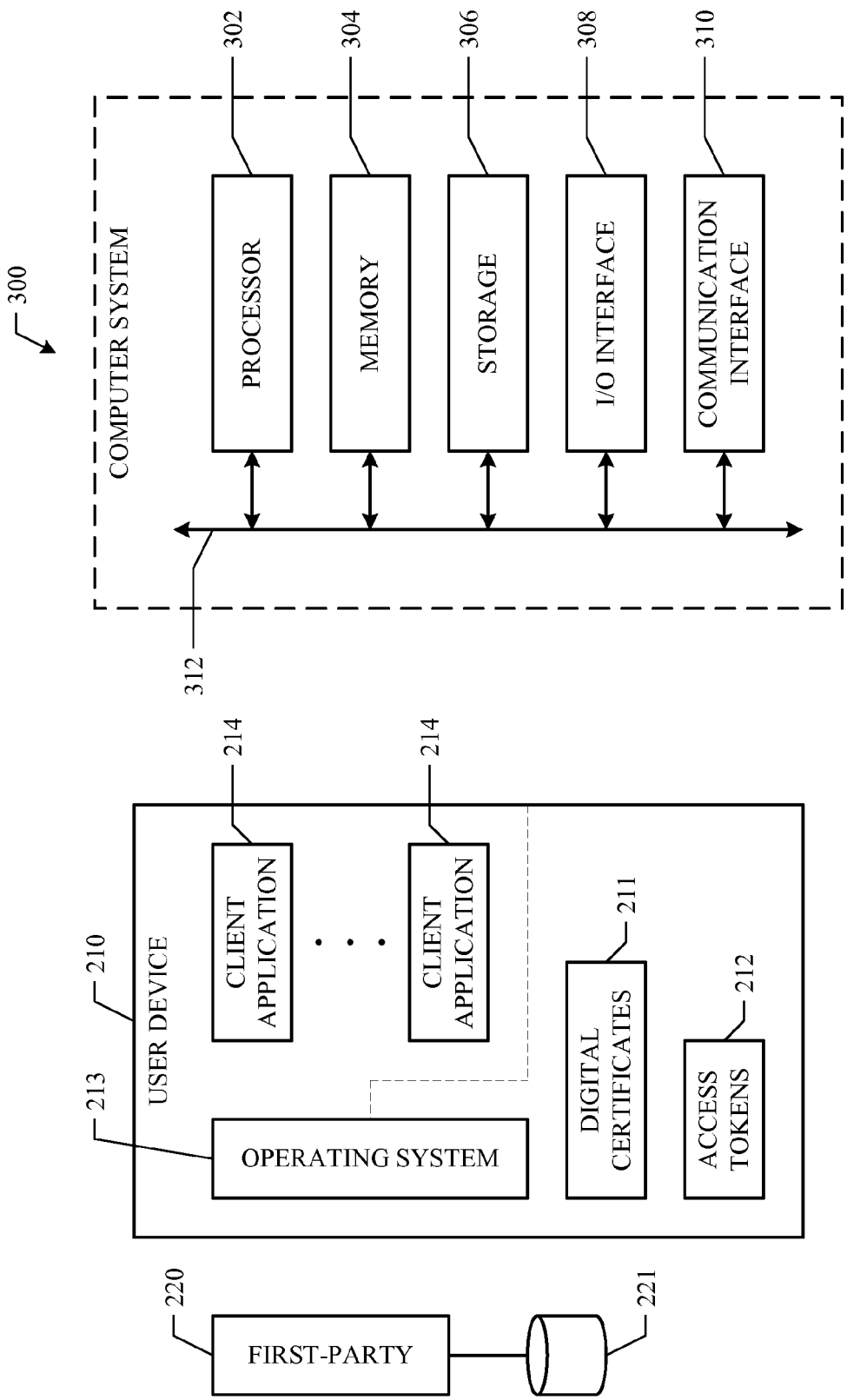

PROXY AUTHENTICATION

TECHNICAL FIELD

This disclosure generally relates to authenticating client applications for data access through operating systems.

BACKGROUND

Data or information security often involves controlling access to specific data by specific entities. Given a set of data, the data's owner may specify which entities are allowed access to the data, or how an entity requesting access to the data should be authenticated before granting it access to the data. There are various ways to control access to a specific set of data. For example, the data may be protected with an access code (e.g., a password or an access token). Only an entity who is able to supply the correct access code is grant access to the data. As another example, each time an entity requests access to the data, an explicit request may be sent to the data's owner, giving the owner the choice of granting or denying the entity access to the data.

A social-networking system, such as a social-networking website, enables its users to interact with it and with each other through the system. The social-networking system may create and store a record, often referred to as a user profile, in connection with the user. The user profile may include a user's demographic information, communication channel information, and personal interests. The social-networking system may also create and store a record of a user's relationship with other users in the social-networking system (e.g., social graph), as well as provide services (e.g., wall-posts, photo-sharing, or instant messaging) to facilitate social interaction between users in the social-networking system.

Social-networking systems may provide application programming interfaces that allow developers to configure applications that access information maintained by the social-networking system, such as profile information of a user, the identity of social network contacts of a user, a news feed of a user, and the like. Such applications may be web-based applications hosted by a server accessed by browser clients, or may be native applications locally installed on a client device (or a combination of the foregoing). Indeed, in some social-networking systems, a user may add so-called canvas applications to his or her user profile. Canvas applications may be third party applications that a user may access by clicking on a link or other control provided by a web page of the social-networking system. The canvas application may be hosted by a third party system and run in an iframe (or other section) of a web page provided by the social-networking system.

SUMMARY

This disclosure generally relates to authenticating client applications for data access through operating systems. More specifically, an operating system acts as a proxy for individual client applications to request access to a set of data associated with or managed by a first party.

In particular embodiments, receiving, by an operating system of the first computing device and from a client application executing on the first computing device, a first request for accessing a set of data associated with a user of the first computing device, wherein the set of data is managed by a second computing device; sending, by the operating system of the first computing device on behalf of the client application and to the second computing device, a second request for accessing the set of data, wherein the second request comprises an application identifier indentifying the client application, a developer identifier indentifying a developer of the client application, and an access type for accessing the set of data; receiving, by the operating system of the first computing device and from the second computing device, a response to the second request; and if the response to the second request grants the client application access to the set of data, then forwarding, by the operating system of the first computing device and to the client application, an access token to be used by the client application for accessing the set of data with the second computing device, wherein the access token is received by the operating system of the first computing device and from the second computing device.

These and other features, aspects, and advantages of the disclosure are described in more detail below in the detailed description and in conjunction with the following figures.

BRIEF DESCRIPTION OF THE DRAWINGS

FIG. 2 illustrates an example user device.

FIG. 3 illustrates an example computer system.

DESCRIPTION OF EXAMPLE EMBODIMENTS

Figure 1:
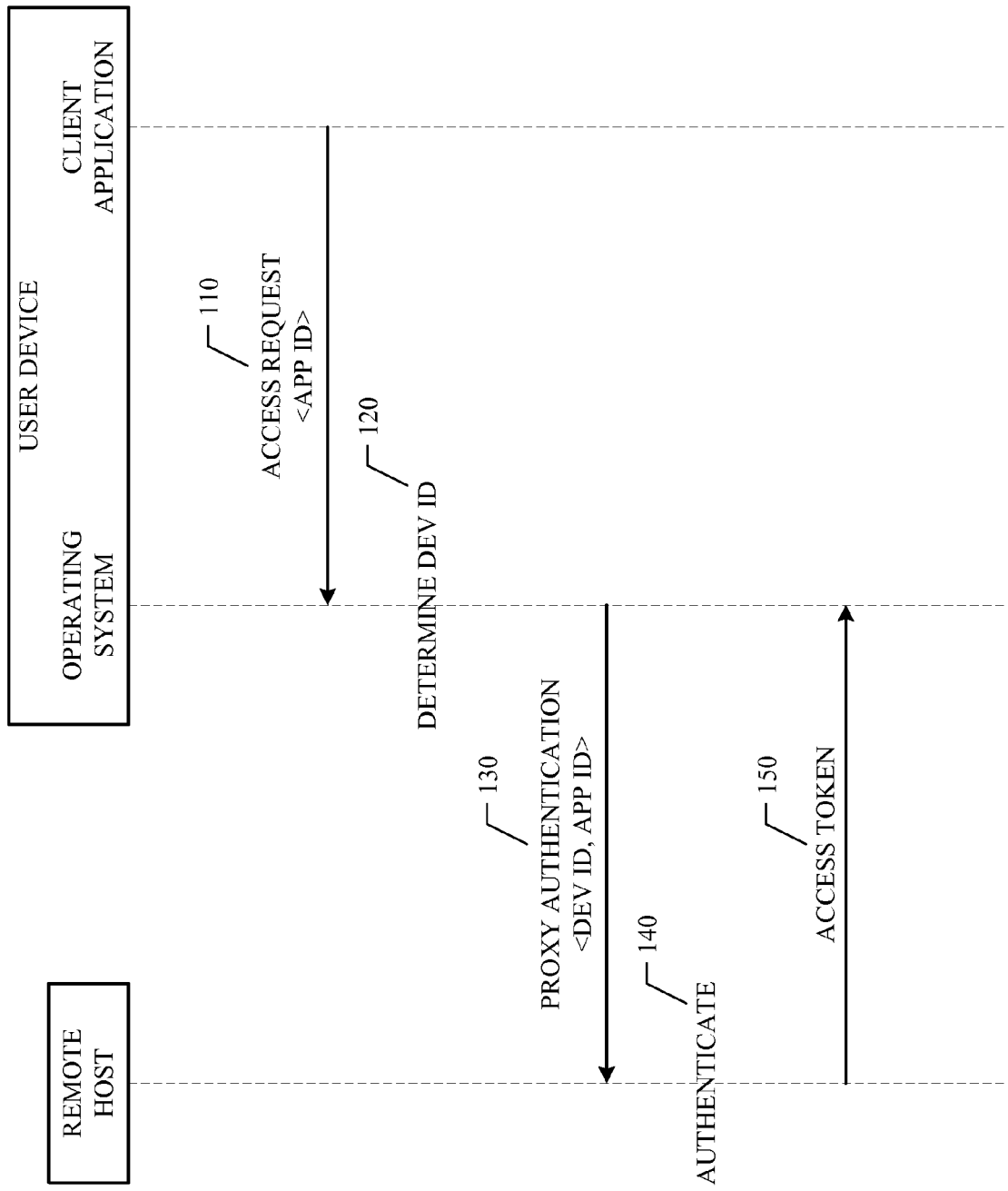
FIG. 1 illustrates an example process flow where an operating system acts as a proxy for a client application to request access to a set of data associated with or managed by a first party.

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Sometimes, an application developed by one party may wish to access data or information associated with, owned, and/or controlled by another party. For clarification purposes, hereafter, with respect to a specific set of data, the party that is directly associated with the data (such as a user is associated with user profile data of that user) is referred to as the "first party", and a party that wishes to access the data associated with the first party is referred to as a "third party". In particular embodiments, when an application developed by a third party wishes to access data associated with or managed by a first party, instead of the third party requesting data access directly from the first party, an operating system may act as a proxy for the third party and request data access from the first party on behalf of the third party.

FIG. 1 illustrates an example process flow where an operating system acts as a proxy for a client application installed in a client device platform to request access to a set of data associated with or managed by a first party hosted on a remote system. FIG. 2 illustrates an example user device. FIGS. 1 and 2 are described in connection of each other.

In particular embodiments, a user device 210, such as a desktop computer or a mobile device (e.g., notebook computer, netbook computer, mobile telephone, a gaming console, etc.), may have an operating system 213 and a number of client applications 214. For example, user device 210 may be an iPhone® provided by Apple, Inc. of Cupertino, Calif. Client applications 214 may be installed on and execute on user device 210. In particular embodiments, user device 210 may have a storage medium (e.g., memory or hard drive), and a section of the storage medium is secure and tamper-proof and may be used to store secure information (e.g., digital certificates 211 or access tokens 212).

In particular embodiments, there is a first party 220 that is responsible for managing data 221 stored on remote hosts (e.g., on servers or in databases) associated with first party 220. In particular embodiments, first party 220 may be a social-networking system, and a user of user device 210 may be a member of social-networking system 220.

Data 221 may be data of the user maintained by social-networking system 220, such as the user's profile, social connections and contacts, calendar entries, interests and hobbies, news feeds generated for the user, images uploaded to social-networking system 220 by the user, messages or posts sent by or sent to the user, and so on. User data 221 may be stored on remote hosts associated with social-networking system 220. Social-networking system 220 may manage the user's data 221 for the user.

In particular embodiments, social-networking system 220 may provide Application Programming Interfaces (APIs) that enable software applications (e.g., applications developed by third-party developers) to access some or all of the user's data either stored on user device 210 or on remote hosts (e.g., data 221). For example, client applications 214 may access some of the user's data (e.g., profile information, social connections, images, etc.) using the APIs provided by social-networking system 220. At the same time, social-networking system 220 may take necessary steps to ensure that only authorized client applications 214 are able to access user data 221 (e.g., to protect user privacy). For example, when a client application 214 wishes to access some specific user data, the client application 214 needs to be authenticated first before access is granted.

In particular embodiments, operating system 213 of user device 210 proxies authentication sessions between client applications 214 and first-party data manager 220 (e.g., the social-networking system). In particular embodiments, when a client application 214 wishes to access user data 221 stored on remote hosts, instead of requesting an access token directly from first-party data manager 220, the client application 214 may send a request to operating system 213, as illustrated in STEP 110. For example, the client application 214 may make an API call to operating system 213 to open a session with first-party data manger 220 (e.g., the social-networking system), such as "getSession (app_id, permissions)", where "permissions" are the types of access permissions the client application 214 desires. For example, access permissions may include read permissions (e.g., read user's profile information, messages sent to the user, etc.) or write permissions (e.g., upload photographs, post to walls, send emails, update status, check-in at events or locations, etc.). In particular embodiments, the request may include an application identifier (app_id) of the requesting client application 214. Optionally, the request may also include information describing which specific portion of secure data 221 the requesting client application 214 wishes to access (e.g., the requesting client application 214 may not need to access all of data 221 stored on remote hosts).

In particular embodiments, there may be any number of digital certificates 211 stored on user device 210. These digital certificates 211 may be configured by the device manufacturer for individual users of user device 210, and may be stored in a secure, tamper-proof section of the storage medium of user device 210. For example, each authorized user of user device 210 may have his/her own digital certificate 211. When a specific user is running a client application 214 on user device 210, if the client application 214 wishes to access the specific user's data, the user's digital certificate 211 may be used in connection with the authentication process (e.g., used to establish a secure connection between user device 210 and first party 220).

In particular embodiments, the request may be implemented as a function call (e.g., using Objective-C or C). The function may take the application identifier as an input argument (e.g., function_name (app_id, permissions)). When a client application 214 wishes to access data 221, it may invoke this function and pass its own application identifier as the input value to "app_id" and specify the type of access (e.g., read or write) required as the input value to "permissions".

In particular embodiments, operating system 213 may determine a developer identifier (DEV ID, also referred to as "bundle ID") based on the application identifier of the requesting client application 214, as illustrated in STEP 120. The developer identifier indicates the developer (e.g., a software company) of the requesting client application 214. When each client application 214 is first installed on user device 210, operating system 213 may determine its application identifier and developer identifier and maintain a record of the information (e.g., as a lookup table). Subsequently, operating system 213 may use this record to lookup the developer identifier based on an application identifier.

In particular embodiments, operating system 213 may send a request to first-party data manager 220 on behalf of the requesting client application 214, as illustrated in STEP 130. The request, such as proxy.Authorize (app_id, developer_id, permissions), may include both the developer identifier (e.g., "ABCD1234") and the application identifier of the requesting client application 214. The request may also contain a user identifier (or any other suitable account identifier) that the remote host may associate to a set of data (such as user account data). Optionally, the request may also include information describing which specific portion (permissions) of user data 221 client application 214 wishes to access (e.g., the information from the initial request received from client application 214). In particular embodiments, operating system 213 may establish a secure network connection (e.g., SSL connection) with first-party data manager 220, and send the request over this secure connection. The SSL connection may be established using a digital certificate 211 stored in the secure section of the storage medium of user device 210. For example, the SSL implementation on first-party data manger 220 may be configured with an SSLVerifyClient mandate that requires a client to present a valid digital certificate. By limiting SSL connections to valid digital certificates, some confidence in the identity of the device and/or user is obtained. This is especially true if the digital certificate is stored in a tamper-resistant storage of the user device and possibly installed by the device manufacture.

In particular embodiments, first-party data manager 220, upon receiving the request (and assuming the validation of the user device level digital certificate and establishment of an SSL connection), may authenticate the requesting client application 214 based on its application identifier and developer identifier, as illustrated in STEP 140. For example, first-party data manager 220 may maintain a record of all client applications that have access to the user data 221 associated with the user identifier corresponding to the request (and/or the client-side digital certificate associated with the SSL connection). If the requesting client application 214 is one of them (e.g., based on its application identifier and developer identifier), then access to user data 221 is granted. Otherwise, access to user data 221 is denied.

Note that the combination of developer identifier and application identifier uniquely identifies each client application 214. However, there are other means to uniquely identify a set of client applications. For example, a globally unique identifier may be assigned to each client application 214.

If the requesting client application 214 is allowed access to user data 221, first-party data manager 220 may send an access token to operating system 213, as illustrated in STEP 150. In one implementation, the access token may comprise a session key and a session secret, which may be a hashed value for a specific session. Operating system 213 may then forward the access token to the requesting client application 214 so that the requesting client application 214 can use the access token to access data associated with the user on remote host 220. In particular embodiments, the access token may have an expiration time. For example, a client application 214, once obtained an access token, may use the access token to access user data 221 for the current session or for a specific time period (e.g., 24 hours), until the access token expires. Thereafter, the client application 214 needs to request another access token in order to access user data 221.

In particular embodiments, upon receiving a valid access token 212 from first party 220, operating system 213 or the requesting client application 214 may store the access token 212 on user device 210 (e.g., in the secure section of the storage medium of user device 210). While the access token 212 has not yet expired, the requesting client application 214 can use the same access token 212 to access user data 221 repeatedly. At the same time, operating system 213 may ensure that only the requesting client application 214 can use this specific access token 212, which has been obtained for the requesting client application 213, and that other client applications 214 installed on user device 210 cannot use this specific access token 212.

On the other hand, if the requesting client application 214 is denied access to user data 221, first-party data manager 220 does not send any access token to operating system 213. Instead, first-party data manager 220 may respond with a predefined signal so that operating system 213 can notify the requesting client application 214 that its request to access user data 221 has been denied.

In particular embodiments, user device 210 may be associated with a user who is a member of a social-networking website. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

Data 221 may include the user's information with the social-networking website (e.g., profile, background information, social connections, photographs uploaded to the social-networking website by the user, messages and posts, social calendar and events, check-ins, status updates, notifications, news feeds, etc.). In this case, the social-networking website may be first-party data manager 220, which controls access to the user's social and other information by client applications 214. In some cases, the user may specify to the social-networking website which client applications 214 can have access to which of the user's information (e.g., using setup options provided through the user's account), such as when the user is aware of or has used a specific client application 214 and thus knows what information the specific client application 214 needs. In other cases, a client application 214 may go through the operating system in order to request access permissions from the user. The operating system may display a request for information from the user on behalf of a specific client application 214, and if the user grants information access to that client application 214, the operating system may send the user's authorization to the social-networking website. Then, each time when a client application 214 wishes to access the user's information (e.g., data 221), instead of contacting and troubling the user, operating system 213 may send a request to the social-networking system hosting the social-networking website (i.e., first-party data manager 220). The social-networking system may authenticate the client application 214 according to the specification previously made by the user regarding access to the user's information. In one implementation, a user may specific access permissions (e.g., read or write) for a client application and store the permissions in the user's account with the social-networking websites (e.g., as a part of the configuration settings). Subsequently, the social-networking websites (i.e., the first-party data manager) may determine whether a specific client application has access to the user's data stored with the social-networking websites, and if so, which access permissions the client application has based on the configuration settings stored in the user's account. Of course, the user can modify these settings at any time.

Implementations of the invention can be configured to allow a user to log in to the remote host 220 once using user device 210 (such as a smart phone) and, relative to the particular user device 210, remain logged in until the user explicitly chooses to log out. For example, a user may access remote host 220 using a client application installed on user device 210 and explicitly log-in to a user account maintained by the remote host 220. Once logged into the remote host 220, the client applications 214 installed on the user device 220 may have instant access to the data associated with the user maintained by or available through remote host 220 without requiring the user to explicitly log in to an account or otherwise provide a user name and password. For example, when processing a proxy authorization request that identifies a particular user, the remote host 220 may access account information of the user to determine whether that user remains logged in on the particular user device 210. For example, login status information can be associated with the client-side digital certificate of the user device. The remote host 220 may access this information to determine whether the user remains logged in relative to that user device 210 as part of authenticating the proxy authorization request.

In addition, the user may configure which client applications 214 may access his or her data by adding or removing client applications from his or her account. In some implementations, this list of applications may correspond to mobile and web versions of a given application. For example, assume that a user accesses remote host 220 using a desktop PC and "installs" a particular web-based, canvas application, and later installs a mobile version of the same application on user device 210. Data access for the mobile version of the application may be allowed based on the user's installation of the canvas application.

Particular embodiments may be implemented on one or more computer systems. FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 300 may include one or more computer systems 300; be unitary or distributed; span multiple locations; span multiple machines; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include an HDD, a floppy disk drive, flash memory, an optical disc, a magneto-optical disc, magnetic tape, or a Universal Serial Bus (USB)

drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 302 (such as, for example, one or more internal registers or caches), one or more portions of memory 304, one or more portions of storage 306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by an operating system of a client computing device, receiving from a software application executing on the client computing device a first request to access a first portion of user data stored at a remote host;
   by the operating system, in response to receiving the first request from the software application, sending to the remote host a proxy authentication request enabling the operating system to act as a proxy for the software application to request access to the first portion of the user data stored at the remote host, wherein the proxy authentication request specifies one or more types of access permissions, the types of access permissions comprising read permissions and write permissions;
   at the operating system, receiving from the remote host, an access token granting the software application access to the user data stored at the remote host, wherein the access is granted in accordance with the specified types of access permissions;
   by the operating system, in response to receiving the access token, then forwarding the received access token to the software application; and
   by the operating system, upon receiving a second request to access a second portion of the user data, authenticating a source of the second request and (1) if the source is the software application that previously received the access token, then granting access and transmitting a request for the second portion of the user data to the remote host using the access token, (2) else if the source is another software application, then denying access to the second portion of the user data.

2. The method of claim 1, wherein:
   the remote host is associated with a social-networking system; and
   the user data stored at the remote host is associated with a user of the client computing device, wherein the user is a member of the social-networking system.

3. The method of claim 1, wherein the proxy authentication request comprises an application identifier of the software application.

4. The method of claim 1, wherein the proxy authentication request comprises a developer identifier of a developer of the software application.

5. The method of claim 1, wherein the received access token grants the software application direct repeated accesses to the user data stored at the remote host.

6. The method of claim 1, wherein the proxy authentication request comprises an identifier identifying a user of the client computing device associated with the user data stored at the remote host.

7. The method of claim 1, wherein the proxy authentication request is sent over a secure connection between the client computing device and the remote host.

8. The method of claim 1, wherein the software application is provided by a first entity and the remote host is operated by a second entity that is separate from the first entity.

9. The method of claim 1, wherein a user has authorized the software application to access data stored at the remote host.

10. A client computing device comprising:
    a memory comprising instructions executable by one or more processors; and
    the one or more processors, coupled to the memory and operable to execute the instructions, the one or more processors being operable when executing the instructions to:
    receive, by an operating system of the client computing device from a software application executing on the client computing device, a first request to access a first portion of user data stored at a remote host;
    send, by the operating system, in response to receiving the first request from the software application, to the remote host a proxy authentication request enabling the operating system to act as a proxy for the software application to request access to the first portion of the user data stored at the remote host, wherein the proxy authentication request specifies one or more types of access permissions, the types of access permissions comprising read permissions and write permissions;
    receive, at the operating system, from the remote host, an access token granting the software application access to the user data stored at the remote host, wherein the access is granted in accordance with the specified types of access permissions;
    forward, by the operating system, in response to receiving the access token the received access token to the software application; and
    upon receiving a second request to access a second portion of the user data, authenticating a source of the second request and (1) if the source is the software application that previously received the access token, then granting access and transmitting a request for the second portion of the user data to the remote host using the access token, (2) else if the source is another software application, then denying access to the second portion of the user data.

11. The client computing device of claim 10, wherein:
the remote host is associated with a social-networking system; and
the user data stored at the remote host is associated with a user of the client computing device, wherein the user is a member of the social-networking system.

12. The client computing device of claim 10, wherein the proxy authentication request comprises an application identifier of the software application.

13. The client computing device of claim 10, wherein the proxy authentication request comprises a developer identifier of a developer of the software application.

14. The client computing device of claim 10, wherein the received access token grants the software application direct repeated accesses to the user data stored at the remote host.

15. The client computing device of claim 10, wherein the proxy authentication request comprises an identifier identifying a user of the client computing device associated with the user data stored at the remote host.

16. The client computing device of claim 10, wherein the proxy authentication request is sent over a secure connection between the client computing device and the remote host.

17. The client computing device of claim 10, wherein the software application is provided by a first entity and the remote host is operated by a second entity that is separate from the first entity.

18. The client computing device of claim 10, wherein the software application has been authorized by a user to access data stored at the remote host.

19. One or more computer-readable non-transitory storage media storing software operable when executed by a client computing device to:

receive, by an operating system of the client computing device from a software application executing on the client computing device, a first request to access a first portion of user data stored at a remote host;

send, by the operating system, in response to receiving the first request from the software application, to the remote host a proxy authentication request enabling the operating system to act as a proxy for the software application to request access to the first portion of user data stored at the remote host, wherein the proxy authentication request specifies one or more types of access permissions, the types of access permissions comprising read permissions and write permissions;

receive, at the operating system, from the remote host, an access token granting the software application access to the user data stored at the remote host, wherein the access is granted in accordance with the specified types of access permissions;

forward, by the operating system, in response to receiving the access token, the received access token to the software application; and upon receiving a second request to access a second portion of the user data, authenticating a source of the second request and (1) if the source is the software application that previously received the access token, then granting access and transmitting a request for the second portion of the user data to the remote host using the access token, (2) else if the source is another software application, then denying access to the second portion of the user data.

20. The media of claim 19, wherein:
the remote host is associated with a social-networking system; and
the user data stored at the remote host is associated with a user of the client computing device, wherein the user is a member of the social-networking system.

\* \* \* \* \*